(12) United States Patent
Kamio

(10) Patent No.: US 8,262,052 B2
(45) Date of Patent: Sep. 11, 2012

(54) SEATING AND LOCKING SYSTEM FOR TURBOMACHINERY

(75) Inventor: Keijun Kamio, Sparks, NV (US)

(73) Assignee: Ebara International Corporation, Sparks, NV (US)

( * ) Notice: Subject to any disclaimer, the term of this patent is extended or adjusted under 35 U.S.C. 154(b) by 259 days.

(21) Appl. No.: 12/822,998

(22) Filed: Jun. 24, 2010

(65) Prior Publication Data
US 2010/0327143 A1  Dec. 30, 2010

Related U.S. Application Data

(63) Continuation-in-part of application No. 12/788,215, filed on May 26, 2010.

(60) Provisional application No. 61/269,488, filed on Jun. 24, 2009.

(51) Int. Cl.
*F16M 13/00* (2006.01)

(52) U.S. Cl. .................. 248/580; 248/659; 417/363
(58) Field of Classification Search .................. 248/658, 248/659, 667, 580; 417/363, 312
See application file for complete search history.

(56) References Cited

U.S. PATENT DOCUMENTS

| | | | | |
|---|---|---|---|---|
| 3,935,748 A | * | 2/1976 | Lannen | 73/484 |
| 4,396,360 A | * | 8/1983 | Elson | 417/363 |
| 4,406,592 A | * | 9/1983 | Kropiwnicki | 417/363 |
| 7,063,512 B2 | * | 6/2006 | Haesloop et al. | 417/244 |
| 7,789,202 B2 | * | 9/2010 | Lee et al. | 184/6.2 |

* cited by examiner

*Primary Examiner* — Bradley Duckworth
(74) *Attorney, Agent, or Firm* — Woodcock Washburn LLP

(57) ABSTRACT

A seating and locking system for turbomachinery attached to the customer column housing the turbomachine. The seating and locking system includes two or more actuated pistons that push against a piston seat or locking groove of the turbomachine. The actuated pistons secure the turbomachine within the costumer column to prevent the turbomachine from moving and getting damaged. The seating and locking system further includes a seat attached below the customer column with two or more spring loaded rods. The seat forces the customer column and the turbomachine to remain fixed to the bottom of the vessel housing the customer column and the turbomachine. Embodiments can be used with pumps, expanders, turbines, compressors, and fans.

20 Claims, 7 Drawing Sheets

SEATING AND LOCKING SYSTEM FOR TURBOMACHINERY

CROSS-REFERENCES TO RELATED APPLICATIONS

This application claims priority from provisional patent application Ser. No. 61/269,488, filed Jun. 24, 2009, and is a continuation-in-part application of non-provisional application Ser. No. 12/788,215, filed May 26, 2010. Both applications are hereby incorporated herein by reference in their entirety to be considered part of this specification.

BRIEF DESCRIPTION OF THE INVENTION

A seating and locking system for turbomachinery attached to the customer column housing the turbomachine. The seating and locking system includes two or more actuated pistons that push against a piston seat or locking groove of the turbomachine. The actuated pistons secure the turbomachine within the costumer column to prevent the turbomachine from moving and getting damaged. The seating and locking system further includes a seat attached below the customer column with two or more spring loaded rods. The seat forces the customer column and the turbomachine to remain fixed to the bottom of the vessel housing the customer column and the turbomachine. Embodiments can be used with pumps, expanders, turbines, compressors, and fans.

STATEMENTS AS TO THE RIGHTS TO INVENTIONS MADE UNDER FEDERALLY SPONSORED RESEARCH OR DEVELOPMENT

Not applicable.

REFERENCE TO A "SEQUENCE LISTING," A TABLE, OR A COMPUTER PROGRAM LISTING APPENDIX SUBMITTED ON A COMPACT DISK

Not applicable.

BACKGROUND OF THE INVENTION

Cryogenic liquids are refrigerated liquefied gases with boiling points below −90° C. at atmospheric pressure. Different cryogens become liquids under different conditions of temperature and pressure. Industrial facilities that produce, store, transport and utilize such gases make use of a variety of valves, pumps and expanders to move, control and process the liquids and gases.

There are problems which can damage a turbomachine, such as a pump or an expander, during standstill conditions. For example, reverse flow can force the shaft of the turbomachine to rotate in reverse, potentially damaging the shaft and introducing stress to the shaft bearings. An unstable foundation can also make the shaft of an expander or a pump rotate. Movement in floating platforms can cause the pump or expander to move around, which can cause the shaft of the pump or expander to get damaged. In floating storage and regasification units that are permanently moored offshore, weather conditions can result in significant movement due to ocean conditions. For example, if the ship motion constantly changes by pitching and rolling, this can inflict continuous side forces on the expander or pump installed in a vessel or on a floating storage tank that can be damaging to the expander or pump.

DETAILED DESCRIPTION OF THE INVENTION

A shaft holding system consisting of two or more brake assemblies surrounding the shaft of turbomachinery. Turbomachinery generally refers to machines that transfer energy from the processing of a fluid or gas using some type of turbine. From herein, the terms "turbomachinery" and "turbomachines" will be used to refer to turbines, expanders, compressors, fans, or pumps.

Each brake assembly consists of one or more hydraulic brakes. In operation, pressure is introduced into a bellows chamber of the brake, which exerts force on a piston. The piston applies force to a brake pad, which forces the brake pads to be pushed against the shaft of the expander, the pump, or other structure. Face seals are used to prevent pressure from escaping around the piston.

Turbomachines with two or more shafts can use a set of brakes for each of the two or more shafts. For example, in a turbine with a first shaft and a second shaft, where torque from the first shaft is transferred to the second shaft via a magnetically coupled membrane, a first set of brakes can be used for the first shaft and a second set of brakes can be used for the second shaft. Alternative embodiments can also include more than one set of brakes for each shaft. For example, a first set of brakes can be used on the top portion of a turbine shaft, and a second set of brakes can be used for the bottom portion of the turbine shaft.

Figure 1:
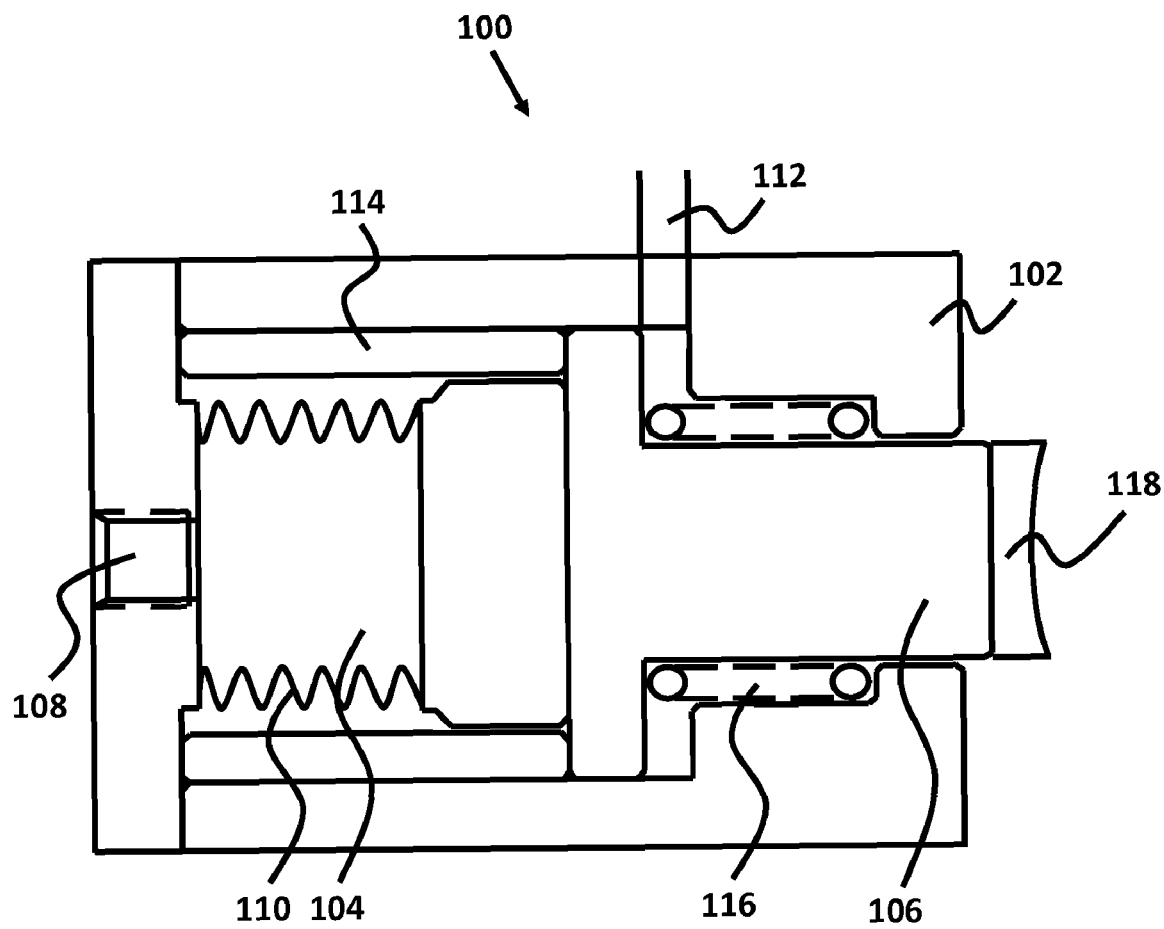
FIG. 1 is a cross-sectional view of a brake assembly in accordance with an embodiment.

FIG. 1 illustrates a brake assembly 100 in accordance with an embodiment. The brake assembly consists of a brake body 102 encasing a bellows chamber 104 and a piston 106. Pressurized gas or liquid enters the bellows chamber 104 through inlet 108. The pressurized gas or liquid can be a mostly inert gas or liquid, such as nitrogen gas. The bellows chamber 104 expands as a result of the gas or fluid fed into the bellows chamber 104 forcing the piston 106 to move. The bellows chamber 104 includes a flexible conduit 110 that is seal welded to seal the high pressure of the bellows chamber 104. The piston travel, illustrated by the two lines 112, is restricted by a sleeve or piston stop 114 and resisted by a bias spring 116 surrounding the piston 106, which biases the piston 106 away from a shaft of a turbomachine (not shown). The end of the piston 106 includes a brake pad 118 that engages the shaft by being pushed against the shaft. Keeping the shaft from rotating is desirable in order to prevent damage to the bearings. When gas or fluid is bled from the bellows chamber 104, the bias spring 116 acts to pull the piston away from the shaft. Alternative embodiments may consist of a spring that biases the piston toward the shaft of the turbomachine and a bellows chamber 104 that pushes the piston away from the shaft when pressure is increased within the bellows chamber.

Figure 2A:
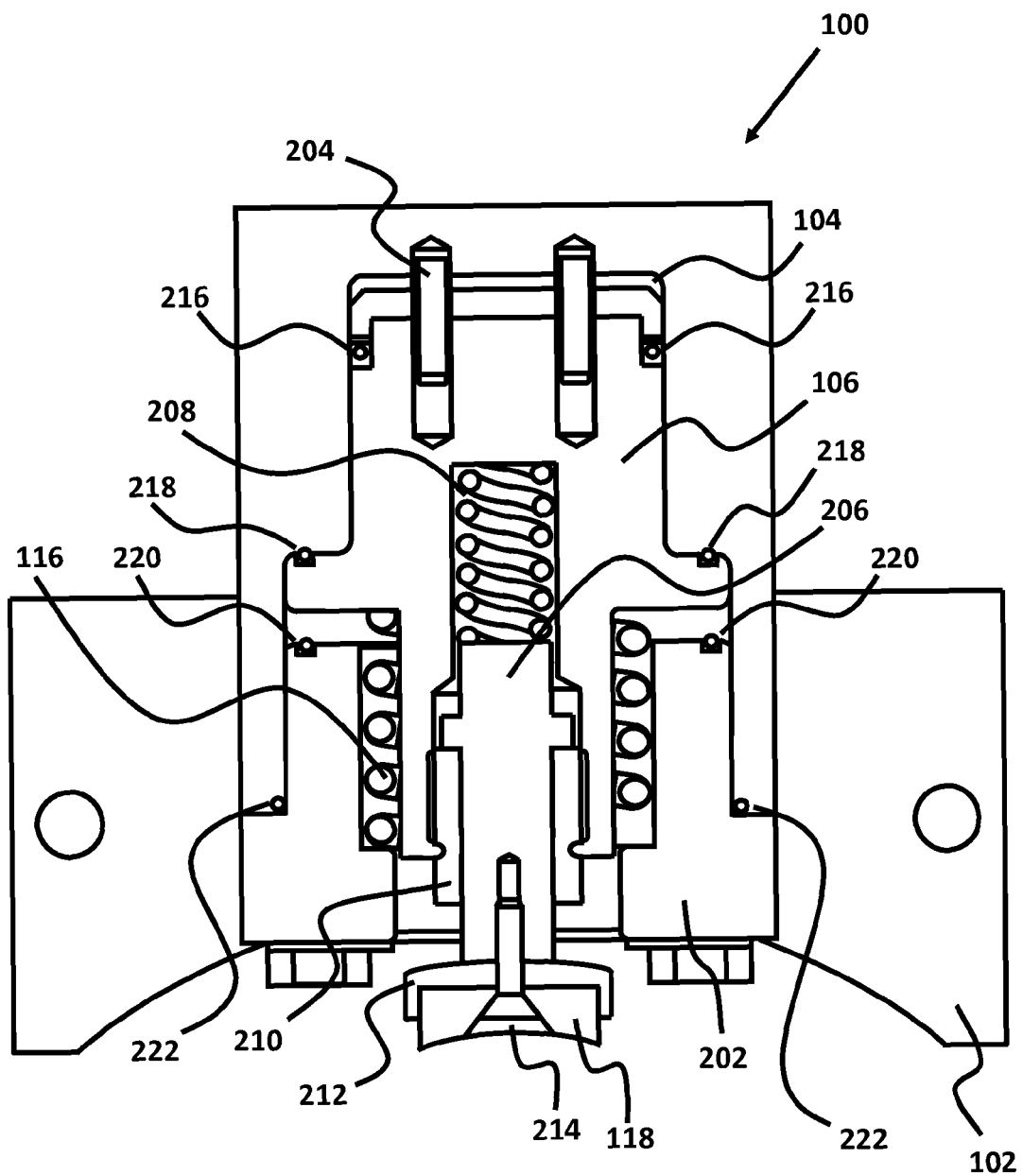
FIGS. 2A and 2B illustrate a cross-sectional, detailed view of the brake assembly from FIG. 1.

FIG. 2A illustrates a cross-sectional, detailed view of the brake assembly 100 from FIG. 1. The brake body 102 is further comprised of a brake plate 202. A pair of pins or dowels 204 control travel of the piston 106 within the brake body 102. The various parts of the brake assembly can be made from metal, such as steel or stainless steel. Embodiments of the brake body 102 can be made from stainless steel with an SAE grade of 304. Stainless steel of grade 304 consists of a composition of about 18% chromium and about 10% nickel. The brake plate 202 can be made with stainless steel with a composition of about 18% chromium and about 8% nickel. However, alternative embodiments may use different metals with different compositions based on the process requirements.

The brake piston 106 can similarly be made from stainless steel or other metals. The brake piston 106 exerts a force on a brake rod 206 via a central spring 208. A brake stop 210 prevents the brake rod 206 from fully extending under the expansion pressure of the central spring 208, thus restricting the piston travel. The brake rod 206, with the central spring 208, allow for pressure to be applied on the various face seals (further described below) of the brake assembly 100 and on the shaft (not shown) of the turbomachine. As previously noted, the bias spring 116 exerts pressure against the piston 106 in a direction opposite the shaft such that when pressure is removed from the bellows 104, the piston is retracted from contact with the shaft.

The brake pad 118 is attached via a support disk 212 to the brake rod 206. A screw cap 214 is used to attach the brake pad 118 to the piston 106. The brake pad 118 can be made out of Polytetrafluoroethylene (PTFE). The support disk 212 and the screw cap 214 can be made out of metal, such as stainless steel.

A pressure seal 216 seals the pressure inside of the piston 106. The pressure seal 216 can be made out of Tetrafluoroethylene (TFE) with a stainless steel spring. A first face seal 218 on the piston 106 creates a seal between the piston 106 and the upper portion of the brake body 102 when the piston 106 is disengaged. The piston 106 is disengaged when the piston 106 is not exerting a force against the shaft of the system. A second face seal 220 creates a seal between the piston and the brake plate 202 when the piston 106 is engaged. The piston 106 is engaged when the piston is exerting a force on the shaft of the system. The face seals 218 and 220 can be o-rings made from PTFE. A third face seal 222 can also be used between the brake plate 202 and the upper portion of the brake body 102 to seal the pressure within the brake assembly 100.

Figure 2B:
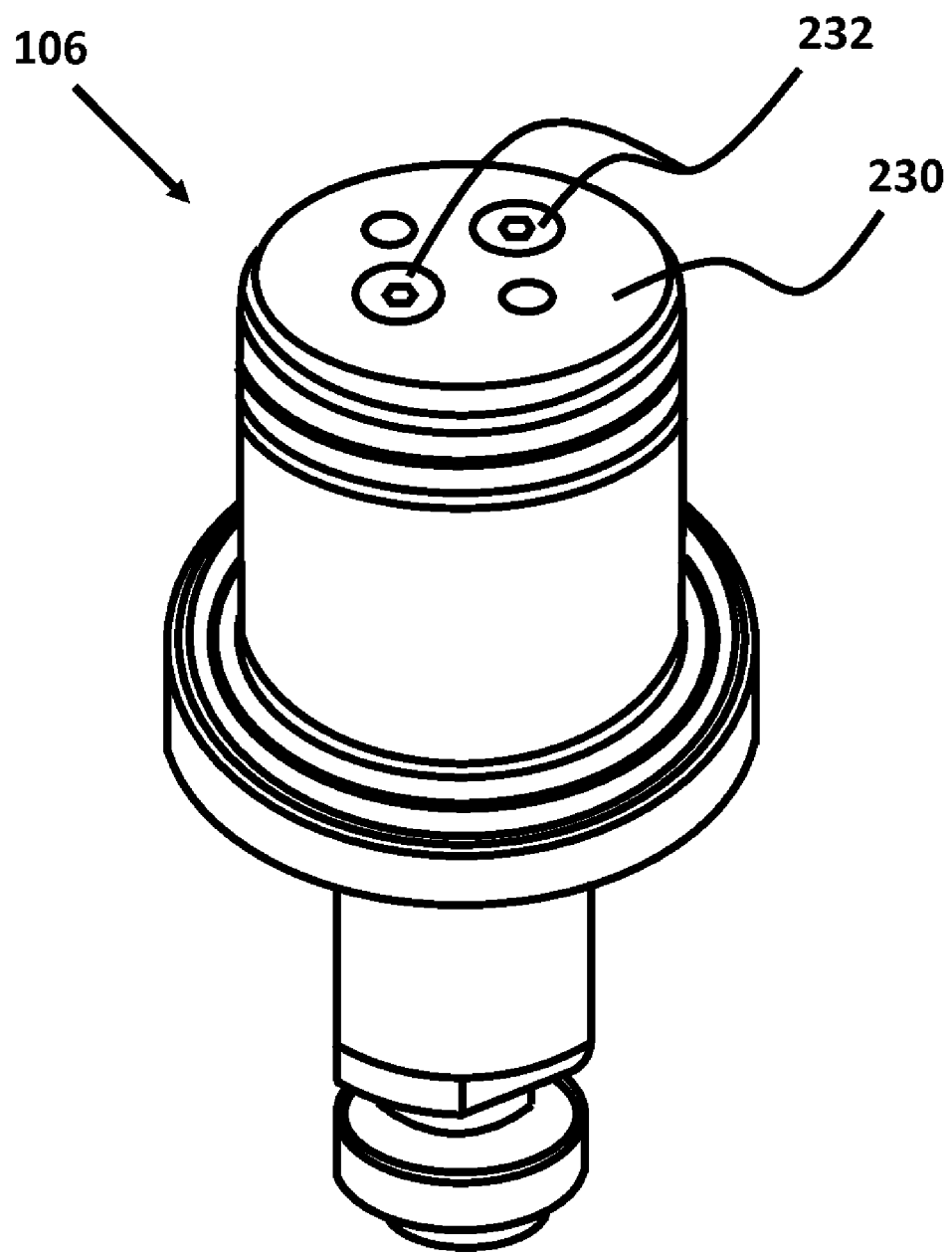

FIG. 2B shows a perspective view of the brake piston 106. The piston 106 includes a piston cap 230 which is attached via a pair of screws 232. For example, the screws used can be flat head, hex screws, etc.

Figure 3A:
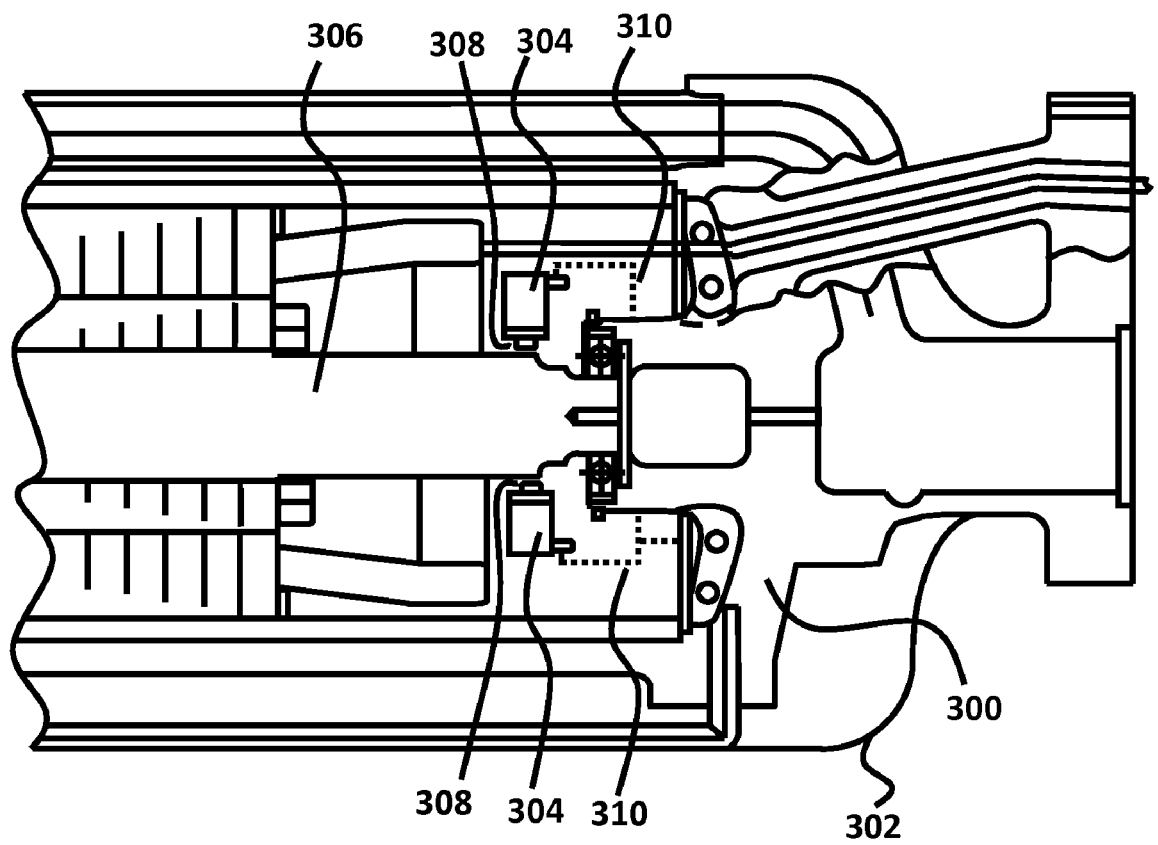
FIGS. 3A and 3B illustrate a partially broken, cross-sectional view of a turbomachine with two brakes holding a shaft of the turbomachine in accordance with an embodiment.
Figure 3B:
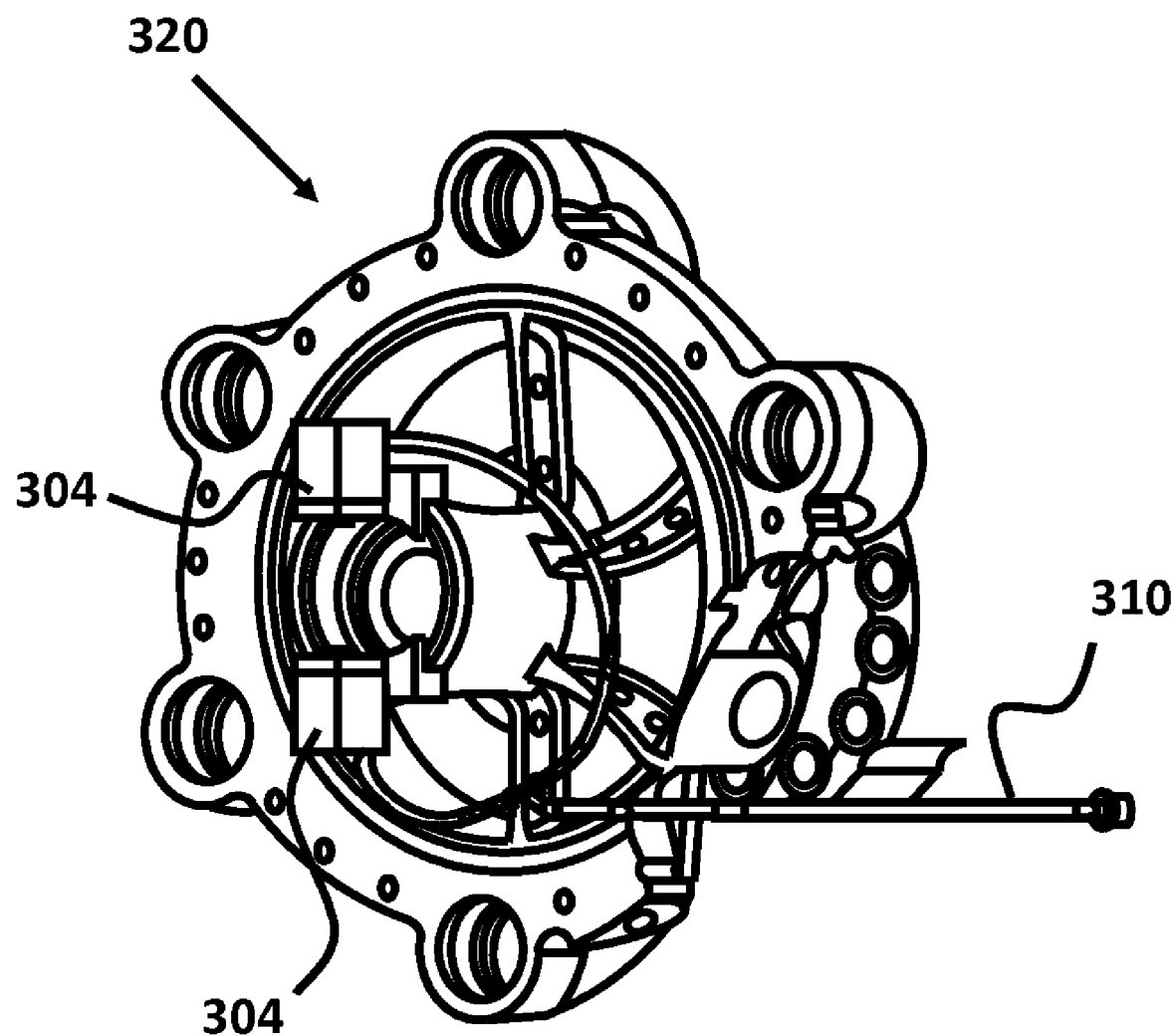

FIG. 3A illustrates a partially broken, cross-sectional view of a pump/expander 300 seated within a vessel 302. Two brakes 304 are positioned opposite of each other across the shaft 306 of the pump/expander 300. The brake pads 308 of the brakes 304 push against the shaft 306 when the pistons (not shown) of the brakes 304 are engaged. Supply lines 310 provide pressurized fluid or gas from a source inside or outside of the vessel through the head plate of the pump/expander 300. The two brakes 304 can be fed via a single supply line 310 which splits to feed each of the brakes 304. Alternatively, each of the brakes 304 can be fed via its own supply line. FIG. 3B illustrates a perspective view of the head plate 320 of the pump/expander 300, with a single, external supply line 310 for supplying pressurized fluid or gas to the brakes 304.

Embodiments are not limited to using only two brakes to support the shaft 306. For example, depending on the size of the shaft and the size of the brakes, more than two brakes may be necessary. It may also be determined that when the vessel is subject to constant and heavy forces, more than two brakes may be necessary to reduce the stress on the bearings. Brakes need not be arranged opposite of each other across the shaft, at angles of approximately 180 degrees from each other. However, it is important for the overall forces applied by the brakes to the shaft be balanced; otherwise additional stress could be introduced to the bearings. For example, if three brakes are used, they should be positioned at angles of approximately 120 degrees from each other so as to balance the forces between the three brakes and steps should be taken to make sure that all three brakes employ and deploy at the same time, such as by using a single feed line with split lines of approximately equal length to each brake so gas or fluid being supplied to one brake does not arrive before gas or fluid supplying other brakes.

If the pump/expander or other structure includes more than one shaft, a set of brakes can be used for each shaft of the pump/expander. For example, an expander may consist of a turbine shaft and an electric motor shaft, with the torque from the turbine shaft transmitted to the electric motor shaft through a magnetic coupling membrane. In such an expander, a first set of brakes can be used to secure the turbine shaft and a second set of brakes can be used to secure the electric motor shaft. The fluid or gas used to feed the hydraulics of the first set of brakes and the second set of brakes can be supplied via a single feed line, with the single feed line first splitting into a first feed line for the first set of brakes and a second feed line for the second set of brakes. The first feed line and the second feed line may subsequently split into two or more feed lines as necessary for each brake within each set of brakes. Alternatively, each set of brakes can have its own independent feed line, which is subsequently split as necessary to feed each brake within each set of brakes. Alternative embodiments may also use the fluid or gas being pumped or expanded to feed the hydraulics of the brake assembly. Since the shaft holding system described herein is used during standstill conditions, the supply line can also extract fluid or gas from the vessel housing the pump/expander.

An embodiment is directed to a seating and locking system for turbomachinery. The seating and locking system is attached to the customer column housing a turbomachine. Embodiments herein will be described with reference to a pump. However, embodiments are not limited to use in pumps. Embodiments may also be used in expanders or other turbomachinery.

The seating and locking system includes one or more actuated pistons that push against a piston seat or locking groove of the pump. The actuated pistons secure the pump within the costumer column to prevent the pump from moving and getting damaged. The seating and locking device further includes a pump seat attached underneath the customer column. The pump seat forces the customer column and the pump to seat itself on the bottom of the vessel housing the customer column and the pump. The pistons are arranged around the circumference of the pump so as to balance the forces applied to the pump by each of the pistons. For example, if two pistons are used, the pistons can be arranged at angles of approximately 180 degrees from each other. Alternatively, if three pistons are used, the pistons can be positioned at angles of approximately 120 degrees from each other so as to balance the forces between the three pistons. Steps should be taken to make sure that all pistons are deployed at the same time, such as by using a single feed line with split lines of approximately equal length to each piston so the gas or fluid being supplied to one piston does not arrive before gas or fluid supplying the other pistons arrives.

Embodiments can be used in combination with a shaft holding system as is disclosed above. For example, the seating and locking system can prevent the entire pump from moving during standstill conditions due to movement of the vessel housing the pump. In turn, the shaft holding system can be used to reduce stress on the bearings of the pump shaft during standstill conditions and prevent damage due to reverse flow.

Embodiments can be used for turbomachinery used in vessels mounted on unstable foundations, such as floating storage tanks or vessels. Pumps, and especially column mounted pumps installed on floating storage tanks or vessels, can be damaged during standstill conditions due to movement of the vessel. The herein disclosed seating and locking system forces the pump to seat on the suction valve, thus restricting its movement and preventing damage to the pump. The seating and locking system can be installed permanently on the suction valve or installed so as to be removable. In addition, the seating and locking system can be controlled remotely after installation. Embodiments have the additional advantage of not requiring maintenance after installation.

Figure 4:
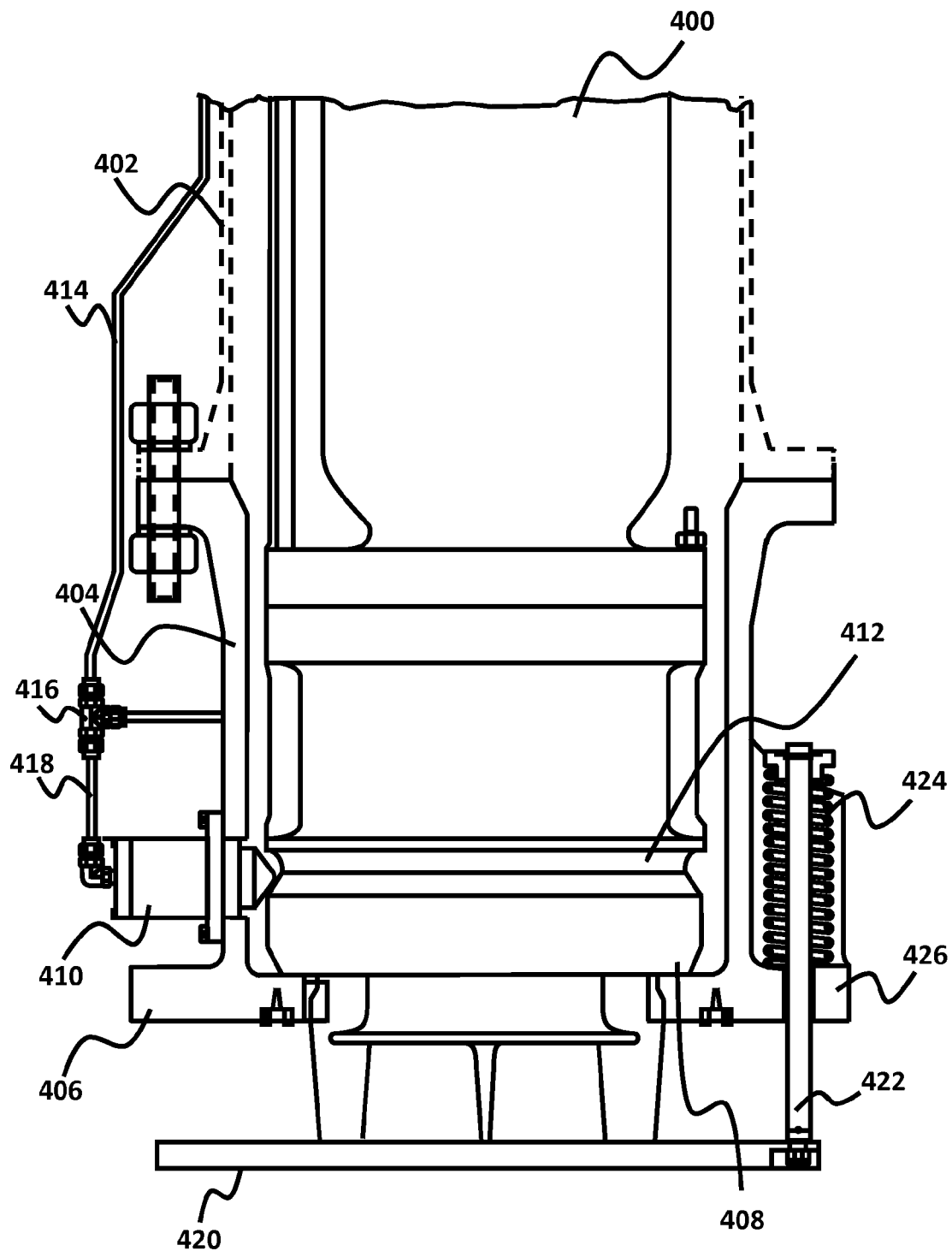
FIG. 4 is a partially broken, cross-sectional view of a seating and locking system with the piston above the pump seal in accordance with an embodiment.

FIG. 4 illustrates a partially broken, cross-sectional view of the seating and locking system in accordance with an embodiment. An in-tank retractable pump 400 is placed inside of a customer column illustrated by dashed lines 402. The customer column 402 is attached to a suction valve 404. The pump 400 is seated on a lower portion 406 of the suction valve 404. The suction valve admits the flow of fluid into the pump 400. A pump seal 408 is positioned between the lower portion 406 of the suction valve 404 and the pump 400 to ensure that fluid that enters the suction valve 404 does not escape.

An actuated piston 410 pushes against the pump 400 at a piston seat/locking groove 412. The locking groove 412 has a large enough surface area to allow the piston 410 to securely engage the pump 400. The perspective of FIG. 4 illustrates a single piston 410. However, embodiments have two or more pistons as deemed necessary depending on the pump structure, the size of the customer column, and the conditions of use of the pump. Embodiments are not limited to pumps or other structures with a locking groove. Alternative embodiments may arrange the pistons so that the pistons engage the pump at a surface area that would not damage the pump and that would allow the pistons to exert force on the pump without slipping.

A single supply line 414 provides a pressurized fluid that feeds the hydraulic assembly of the piston 410, thus allowing the piston to engage the pump 400. The fluid can be a liquid, a gas, or a combination of a liquid and a gas. A line splitter 416 divides the fluid from the supply line 414 into one or more individual pressure lines 418 that feed each piston 410. Embodiments may use the fluid or gas being pumped to feed the supply line 414 by extracting the fluid or gas from the vessel housing the pump. Yet another embodiment may use a single supply line for each piston, rather than splitting a single supply line to feed multiple pistons. The liquid or gas used to feed the supply lines may be a mostly inert gas or liquid.

Various embodiments of piston assemblies can be used for the pistons 410. An embodiment can use the same piston assembly as used for the shaft holding system and as illustrated in FIGS. 1 and 2. For example, the pressure line 418 can feed the hydraulics of the piston 410 through an inlet (not shown), thus increasing the pressure within the piston 410. The pressure increase pushes the piston 410, which in turn forces the rod attached to the piston 410 to push against the locking groove 412 of the pump 400 and prevent the pump 400 from moving from side to side within the customer column 402. Alternative piston assemblies can be used with embodiments of the seating and locking system. The pistons 410 include a bias spring for exerting a bias pressure opposite the pressure within the pistons 410 and sufficient to prevent the pistons 410 from exerting a force on the pump when the pressure within the pistons 410 is decreased.

The entire pump stands on a lower seat 420 that is attached to the suction valve 404 via a spring loaded rod 422. The lower seat 420 is circular, but alternative embodiments may be rectangular, ellipsoid, or some other shape that allows the pump to stand in a balanced position without tipping over. The spring 424 of the spring loaded rod 422 sits on top of a ledge 426 of the lower portion 406 of the suction valve 404. The spring loaded rod 422 is biased to moving the suction valve 404 towards the lower seat 420. The lower seat can be attached to the bottom of the vessel (not shown) housing the pump. Thus, the spring loaded rod 422 forces the suction valve, the customer column, and the pump to remain seated at the bottom of the vessel. The perspective of FIG. 4 shows a single spring loaded rod 422. However, embodiments use two or more spring loaded rods 422 arranged around the circumference of the suction valve 404.

Figure 5:
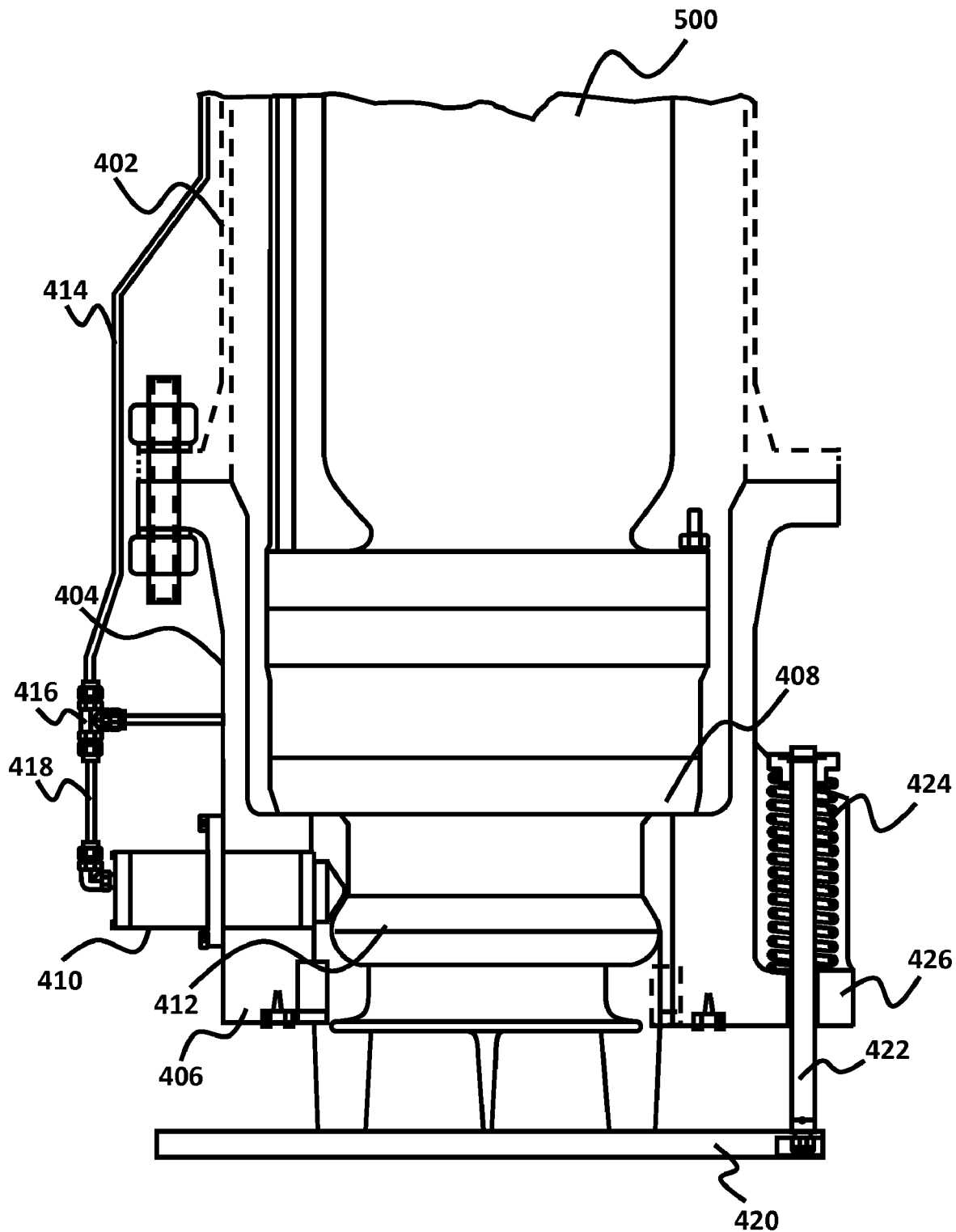
FIG. 5 is a partially broken, cross-sectional view of a seating and locking system with the piston below the pump seal in accordance with an embodiment.

FIG. 5 illustrates a partially broken, cross-sectional view of the pump seating and locking device in accordance with an alternative embodiment. In FIG. 5, the pump seal 408 is positioned between the lower portion 406 of the suction valve 404 and the pump 500, but the pistons are positioned below the pump seal 408. This is in contrast to the embodiment from FIG. 4, where the pistons 410 are positioned above the pump seal 408.

In embodiments, an opening is machined in the suction valve 404 for each of the pistons 410. Each piston 410 can then be placed within the machined opening. Alternative embodiments may not modify the suction valve 404, such as by using smaller pistons 410 or by using a suction valve 404 that includes a wide enough gap to fit the pistons 410 between the inner wall of the suction valve 404 and the pump.

While a number of embodiments have been illustrated and described herein, along with several alternatives and combinations of various elements, for use in a pump, it is to be understood that the embodiments described herein are not limited to pumps and can have a multitude of additional uses and applications. Accordingly, the embodiments should not be limited to just the particular descriptions, variations and drawing figures contained in this specification, which merely illustrate a preferred embodiment and several alternative embodiments.

What is claimed is:

1. A seating and locking system for a machine contained within a vessel, comprising:
   a lower seat placed on a bottom of the vessel;
   two or more pistons arranged around a suction valve of a customer column housing the machine, the machine seated within the customer column and standing on the lower seat;
   a supply line feeding a pressurized fluid to the two or more pistons, the pressurized fluid increasing a pressure within the two or more pistons and causing the two or more pistons to exert approximately equal forces on a locking groove of the machine to prevent the machine from moving from side to side within the customer column; and
   two or more spring loaded rods arranged around a circumference of the suction valve and connecting the suction valve with the lower seat.

2. The seating and locking system as recited in claim 1, wherein the lower seat is substantially circular.

3. The seating and locking system as recited in claim 1, wherein the two or more spring loaded rods are positioned on a ledge of a lower portion of the suction valve and exert a bias force on the customer column pulling the customer column towards the lower seat.

4. The seating and locking system as recited in claim 3, wherein each spring from the two or more spring loaded rods is positioned above of the ledge.

5. The seating and locking system as recited in claim 1, further comprising a seal below the two or more pistons and between the machine and a portion of the suction valve where the machine is seated.

6. The seating and locking system as recited in claim 1, further comprising a seal above the two or more pistons and between the machine and a portion of the suction valve where the machine is seated.

7. The seating and locking system as recited in claim 1, wherein each piston from the two or more pistons includes:
   a bellows chamber adjoining the piston and including an inlet, the supply line feeding the pressurized fluid to the bellows chamber through the inlet, the bellows chamber expanding as the pressure within the bellows chamber increases and exerting a first force on the piston; and
   a brake pad, the piston exerting a second force on the brake pad in response to the first force, and the brake pad exerting a third force on the machine.

8. The seating and locking system as recited in claim 1, wherein a first piston among the two or more pistons is positioned approximately 180 degrees opposite a second piston among the two or more pistons.

9. The seating and locking system as recited in claim 1, wherein each piston from the two or more pistons further includes a bias spring for exerting a bias pressure opposite the pressure and sufficient to prevent each piston from exerting force on the machine when the pressure is decreased.

10. The seating and locking system as recited in claim 1, wherein the pressurized fluid is extracted from the vessel.

11. The seating and locking system as recited in claim 1, wherein the pressurized fluid is a mostly inert gas or a mostly inert liquid.

12. A seating and locking system for a machine contained within a vessel, comprising:
   a lower seat placed on a bottom of the vessel;
   two or more pistons arranged around a customer column housing the machine, the machine seated within the customer column and standing on the lower seat;
   a supply line feeding a pressurized fluid to the two or more pistons, the pressurized fluid increasing a pressure within the two or more pistons and causing the two or more pistons to exert approximately equal forces on the machine to prevent the machine from moving from side to side within the customer column; and
   two or more spring loaded rods arranged around a circumference of the customer column and connecting the customer column with the lower seat.

13. The seating and locking system as recited in claim 12, wherein the lower seat is substantially circular.

14. The seating and locking system as recited in claim 12, wherein the two or more spring loaded rods are attached to the costumer column and exert a bias force on the customer column pulling the customer column towards the lower seat.

15. The seating and locking system as recited in claim 12, further comprising a seal below the two or more pistons and between the machine and a portion of the customer column where the machine is seated.

16. The seating and locking system as recited in claim 12, further comprising a seal above the two or more pistons and between the machine and a portion of the customer column where the machine is seated.

17. The seating and locking system as recited in claim 12, wherein each piston from the two or more pistons includes:
   a bellows chamber adjoining the piston and including an inlet, the supply line feeding the pressurized fluid to the bellows chamber through the inlet, the bellows chamber expanding as the pressure within the bellows chamber increases and exerting a first force on the piston; and
   a brake pad, the piston exerting a second force on the brake pad in response to the first force, and the brake pad exerting a third force on the machine.

18. The seating and locking system as recited in claim 12, wherein a first piston among the two or more pistons is positioned approximately 180 degrees opposite a second piston among the two or more pistons.

19. The seating and locking system as recited in claim 12, wherein each piston from the two or more pistons further includes a bias spring for exerting a bias pressure opposite the pressure and sufficient to prevent each piston from exerting force on the machine when the pressure is decreased.

20. The seating and locking system as recited in claim 12, wherein the pressurized fluid is extracted from the vessel.

\* \* \* \* \*